(12) United States Patent
Quillen

(10) Patent No.: US 11,657,828 B2
(45) Date of Patent: May 23, 2023

(54) METHOD AND SYSTEM FOR SPEECH ENHANCEMENT

(71) Applicant: Nuance Communications, Inc., Burlington, MA (US)

(72) Inventor: Carl Benjamin Quillen, Brookline, MA (US)

(73) Assignee: Nuance Communications, Inc., Burlington, MA (US)

(*) Notice: Subject to any disclaimer, the term of this patent is extended or adjusted under 35 U.S.C. 154(b) by 637 days.

(21) Appl. No.: 16/779,145

(22) Filed: Jan. 31, 2020

(65) Prior Publication Data

US 2021/0241780 A1 Aug. 5, 2021

(51) Int. Cl.
*G10L 19/00* (2013.01)
*G10L 21/0216* (2013.01)
(Continued)

(52) U.S. Cl.
CPC ............ *G10L 21/0216* (2013.01); *G06N 3/02* (2013.01); *G10L 21/0324* (2013.01)

(58) Field of Classification Search
CPC ....... G10L 25/69; G10L 15/063; G10L 21/00; G10L 19/00
See application file for complete search history.

(56) References Cited

U.S. PATENT DOCUMENTS

| | | | |
|---|---|---|---|
| 2018/0082692 A1* | 3/2018 | Khoury | G10L 17/02 |
| 2019/0043491 A1* | 2/2019 | Kupryjanow | G10L 21/0208 |

(Continued)

FOREIGN PATENT DOCUMENTS

| | | | | |
|---|---|---|---|---|
| CN | 106384588 A | * | 2/2017 | G10L 15/02 |
| CN | 107967920 A | * | 4/2018 | G10L 21/0216 |

(Continued)

OTHER PUBLICATIONS

F. Weninger et al., "Deep recurrent de-noising auto-encoder and blind de-reverberation for reverberated speech recognition," 2014 IEEE International Conference on Acoustics, Speech and Signal Processing (ICASSP), Florence, Italy, 2014, pp. 4623-4627, doi: 10.1109/ICAS (Year: 2014).*

(Continued)

*Primary Examiner* — Shreyans A Patel
(74) *Attorney, Agent, or Firm* — Barta, Jones & Foley, PLLC

(57) ABSTRACT

Embodiments improve speech data quality through training a neural network for de-noising audio enhancement. One such embodiment creates simulated noisy speech data from high quality speech data. In turn, training, e.g., deep normalizing flow training, is performed on a neural network using the high quality speech data and the simulated noisy speech data to train the neural network to create de-noised speech data given noisy speech data. Performing the training includes minimizing errors in the neural network according to at least one of (i) a decoding error of an Automatic Speech Recognition (ASR) system processing current de-noised speech data results generated by the neural network during the training and (ii) spectral distance between the high quality speech data and the current de-noised speech data results generated by the neural network during the training.

22 Claims, 6 Drawing Sheets

(51) Int. Cl.
    *G06N 3/02*     (2006.01)
    *G10L 21/0324*     (2013.01)

(56) References Cited

U.S. PATENT DOCUMENTS

| | | | |
|---|---|---|---|
| 2020/0058314 A1* | 2/2020 | Le Roux | G10L 21/0208 |
| 2021/0110812 A1* | 4/2021 | Naylor-Teece | G10L 25/69 |

FOREIGN PATENT DOCUMENTS

| | | | | |
|---|---|---|---|---|
| CN | 110222781 A | * | 9/2019 | |
| CN | 110992934 A | * | 4/2020 | G06N 3/086 |
| EP | 0989540 A1 | * | 3/2000 | |
| JP | H08211888 A | * | 8/1996 | |
| JP | 2015018015 A | * | 1/2015 | G10L 15/20 |
| RU | 2517315 C2 | * | 5/2014 | G10L 19/0204 |
| WO | WO-2006033058 A1 | * | 3/2006 | H04S 1/005 |
| WO | WO-2019044401 A1 | * | 3/2019 | G10L 13/10 |

OTHER PUBLICATIONS

Prenger et al., "WaveGlow: A Flow-based Generative Network for Speech Synthesis," https://arxiv.org/abs/1811.00002 (Oct. 31, 2018).

\* cited by examiner

METHOD AND SYSTEM FOR SPEECH ENHANCEMENT

BACKGROUND

Advances in speech processing technology have led to improved speech recognition performance, which, in turn, has enabled wide spread use of speech data in applications that run on multiple platforms. Speech recognition systems convert input audio, including speech, to recognized text.

SUMMARY

Applications utilizing speech data can benefit from increased speech data quality. Embodiments of the present invention provide improved methods and systems for enhancing the quality of speech data. One example embodiment is directed to a method that improves speech data quality through training a neural network for performing de-noising audio enhancement. The method begins by creating simulated noisy speech data from high quality speech data. In turn, such an embodiment performs training on a neural network using the high quality speech data and the simulated noisy speech data so as to train the neural network to create de-noised speech data, i.e., clean speech data, given noisy speech data.

Performing the training includes minimizing errors in the neural network. In an embodiment, the errors in the neural network are minimized according to at least one of (i) a decoding error of an Automatic Speech Recognition (ASR) system processing current de-noised speech data results that are generated by the neural network during the training and (ii) spectral distance between the high quality speech data (i.e., the speech data used in creating the noisy speech data) and the current de-noised speech data results that are generated by the neural network during the training. According to an embodiment, the training is deep normalizing flow training. In an embodiment, during the deep normalizing flow training the errors in the neural network are minimized as described herein.

An embodiment generates the current de-noised speech data results during the training by processing at least a portion of the simulated noisy speech data with the neural network. Such an embodiment may further include: determining the decoding error during the training by comparing (1) speech recognition results generated by the ASR system processing the current de-noised speech data results and (2) a transcript of at least a portion of the high quality speech data upon which the at least a portion of the simulated noisy speech data was created. In this way, feedback from results of the ASR system is used to improve the training of the neural network.

Another embodiment of the method collects the high quality speech data in a low noise environment. Further, yet another embodiment includes creating the simulated noisy speech data by adding reverberation to the high quality speech data using convolution. Such an embodiment may add the reverberation using convolution by accessing a database comprising at least one of: measured impulse responses from a reverberant environment and synthetically generated impulse responses. An embodiment collects data from an environment in which the ASR system is to be deployed and creates the simulated noisy speech data in accordance with the data collected from the environment.

An embodiment performs the training, e.g., deep normalizing flow training, by training the neural network to learn a maximum-likely encryption of the high quality speech data given the simulated noisy speech data. According to an embodiment, minimizing the errors in the neural network includes adjusting one or more weights of the neural network. Yet another embodiment further comprises, after the training, processing noisy speech data using the trained neural network to determine enhanced speech data.

Another embodiment is directed to a system for de-noising audio enhancement, i.e., enhancing audio by removing noise, that includes a processor and a memory with computer code instructions stored thereon. In such an embodiment, the processor and the memory, with the computer code instructions, are configured to cause the system to implement any embodiments described herein. Another example embodiment is directed to a computer program product for training a neural network for de-noising audio enhancement. The computer program product comprises one or more computer-readable storage devices and program instructions that are stored on at least one of the one or more storage devices where, the program instructions, when loaded and executed by a processor, cause an apparatus associated with the processor to perform any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Embodiments provide techniques for speech enhancement through the training and use of a neural network. The embodiments can be used to directly enhance noisy audio recordings, resulting in clear, natural-sounding speech. The techniques described herein can also be used to implement an efficient front-end processing system for enhancing the performance of Automatic Speech Recognition (ASR) systems in the presence of noise and reverberation. Embodiments can run in real-time with low latency.

Figure 1:
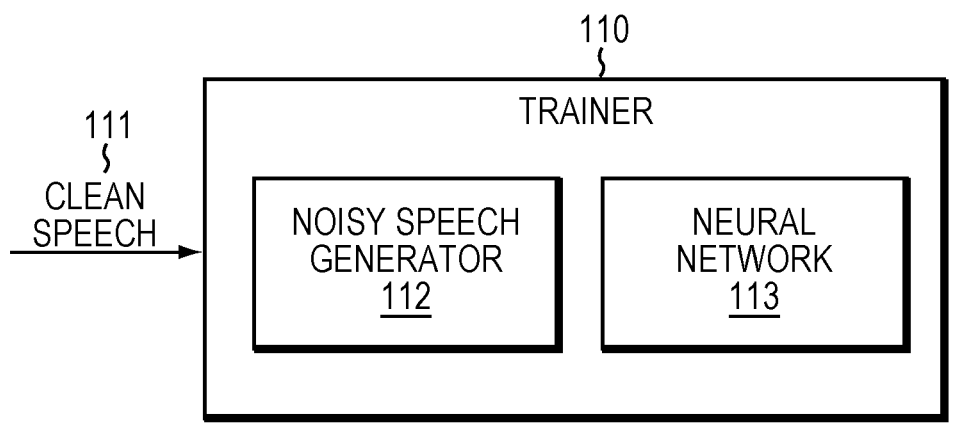
FIG. 1 is a block diagram of a system for training a neural network according to an embodiment.

FIG. 1 depicts a trainer system 110 for training the neural work 113 to determine high-quality, clean speech data (de-noised speech data) from noisy speech data. In operation, the system 110 receives the clean speech data 111. The noisy speech generator sub-system 112 generates noisy speech data from the received clean speech data 111. In turn, the neural network 113 is trained by the trainer 110 using normalizing flow methodologies to generate clean, i.e., de-noised, speech data, from noisy speech data. In an embodiment, the trainer 110 operates in accordance with the method 330 described hereinbelow in relation to FIG. 3.

Figure 2:
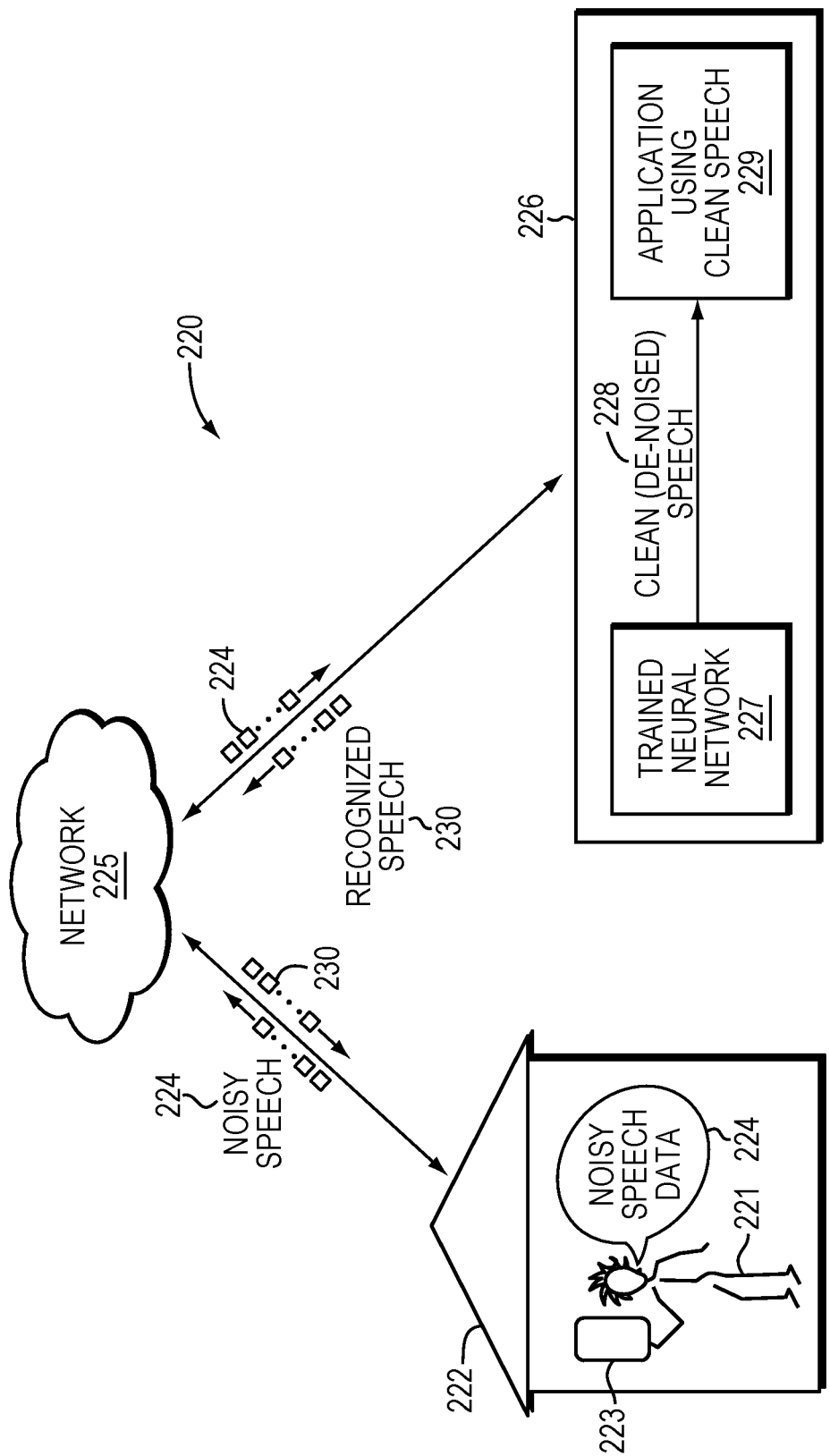
FIG. 2 is a simplified diagram illustrating an implementation of an application using a neural network trained to de-noise data according to an embodiment.

FIG. 2 is simplified illustration of a system 220 for denoising audio enhancement according to an embodiment of the present invention. The system 220 includes the user 221 with the end user device 223 in the environment 222 and the server 226 which includes a trained neural network 227 and an application 229 that utilizes speech data. The trained neural network 227 is trained according to the embodiments described herein to determine de-noised, e.g., clean speech data, given noisy speech data. The application 229 may be any application, i.e., computing process, that utilizes speech data, such as an ASR system.

The end user device 223 and server 226 may be any computing devices known in the art. Further, it is noted that while only the single user 221 and server 226 are depicted, the system 220 may include any number of server devices 226 and users 221 (each with any number of respective end-user devices 223). Further, in the system 220, any number of server devices 226 may be communicatively coupled to form a cloud capable of servicing any number of users 221 and end user devices 223. In the system 220, the end user device 223 is connected to the server 226 via the network 225. However, it is noted that the end user device 223 and server 226 may be connected via any communication method known in the art.

In an example embodiment, the system 220, through use of the application 229, performs speech recognition for the user 221. In one such example, the user 221 makes an indication via the device 223 that speech recognition is desired, e.g., by selecting that speech dictation is desired and, in turn, the user 221 speaks. Because, for example the environment 222 is a crowded restaurant, the user's speaking results in the noisy speech data 224. The noisy speech data 224 is sent by the device 223 via the network 225 to the server 226. The trained neural network 227 processes the noisy speech data 224 and generates the de-noised, i.e., clean speech data 228 which is, in turn, passed to the speech application 229. The speech application 229, e.g., an ASR application, processes the de-noised speech 228 and generates the recognized speech 230. The recognized speech 230 is sent by the server 226 via the network 225 to the user device 223.

While the aforementioned example provides speech recognition, the system 220 is not so limited and the server 226 along with the application 229 may perform any operations known in the art on the clean speech 228. Further, it is noted that while the system 220 includes the server 226 comprising the trained neural network 227 and application 229, embodiments of the present invention are not so limited and the trained neural network 227 and application 229 may be located on any computing device or combination of computing devices. For instance, the neural network 227 and application 229 may be located on the user device 223 or may be located on or across any combination of computing devices communicatively coupled in any combination.

Embodiments train a neural network using normalizing flow techniques and employ this trained neural network to enhance audio data. Normalizing flow-techniques are typically used for generative modeling, e.g., synthetic image generation and text-to-speech waveform synthesis. Normalizing flow-techniques are an alternative to the more commonly known generative adversarial network (GAN) approach. Unlike existing methods, embodiments implement a unique normalizing flow training methodology for audio, e.g., speech, enhancement. Uniquely, embodiments can be implemented as an ASR system front end.

Embodiments provide high-performance, low-latency, audio enhancement and can operate faster than real-time. As such, embodiments can be employed as an enhanced front-end for an ASR system. Further, embodiments can enhance acoustic waveforms at the sample level or enhance ASR features. Moreover, embodiments are capable of removing a variety of different types of noise. For instance, embodiments can strip background speakers out of speech corrupted by multiple speakers, suppress complicated non-stationary noises, and remove reverberation, amongst other examples.

Hereinbelow, an embodiment utilizing Deep Normalizing Flow (DNF) training is described, however, it is noted that embodiments are not so limited and may use a variety of different training methodologies. DNF technology is a machine learning technique for training neural networks that carry out invertible mappings of data. In particular, a network is used to calculate an invertible functional mapping $$f(c|n) \to x$$

where $c \in C$ is a sample of data from a speech database c and $n \in N$ is conditioning information matching c. The desired function $f$ maps speech to x which is typically assumed to be distributed according to an uncorrelated identically-distributed mean 0 unit variance normal distribution $\mathcal{N}$ (x). Therefore, using the rule for functional transformation of probabilities, the network may be used to create a model of the conditional likelihood of the data P(c|n) which can be expressed in the following way:

$$P(c|n) = \mathcal{N}\ (f(c|n))\|J_{f(c|n)}\|. \qquad \text{Equation 1}$$

where $J_f$ is the Jacobian matrix of the transformation $f$.

Using the normalizing flow training technique, the sum log-likelihood of training data for the neural network may thus be written according to the following equation:

$$\Sigma_{c_i n_i \in Training\ data} \log(\mathcal{N}\ (f(c_i|n_i))\|J_{f(c_i|n_i)}\|) \qquad \text{Equation 2}$$

According to an embodiment, Equation 2 is the function that is maximized to train the neural network, which is thus optimized in a maximum likelihood sense with respect to the training data. The function $f$ computed by the network thus becomes a maximum-likelihood encryption of the data, one that reduces speech c to uncorrelated white noise.

Herein, c refers to a database of speech waveforms or spectral features derived from these waveforms, where these spectral features are of a type typically used in ASR systems, e.g., "Mel-scale filter-bank features." In embodiments, the conditioning information is derived from noisy speech. Many possible approaches may be used to derive the conditioning information. In one embodiment, the noisy speech samples are used directly without modification. Spectrally-based features like those typically used by ASR systems (mel-scale filter-bank features) can also be derived from the noisy speech and used for the conditioning. Speaker-dependent embedding vectors may be extracted from segments of the noisy speech and used as part of the conditioning. Features used by noise-robust ASR systems (e.g. gamma-tone filterbanks) might also be used.

According to an embodiment, the neural network is trained using supplied training data that comprises a dataset of speech. The training data is high-quality speech collected in low-noise close-talking environments. C is derived from this set of training data.

A parallel corpus of reverberant, noisy speech is derived from the database of clean speech, c. This corpus of noisy speech data is created by synthetically adding noises to the clean speech at various relative sound levels. Reverberation is synthetically added by convolution, using databases of measured impulse responses from real reverberant environments and/or synthetically generated impulse responses. In an example embodiment, the resulting noisy and reverberant corpus is created in such a way as to reflect the universe of acoustic environments expected to be encountered by the final enhancement system. The conditioning information database N is derived from this noisy/reverberant corpus. During training each utterance drawn from N is presented to the training process along with the matched clean utterance that it was derived from in C.

In an embodiment, $f$ is trained in a maximum-likelihood sense from this C,N parallel corpus. The neural network learns a maximum-likely encryption of the clean data c, mapping it to uncorrelated noise, conditioned on the noisy data from N. Due to the structure of the neural network, $f$ is invertible, and as a result of the training method, given noisy conditioning information n, it can be used to map from the noisy condition information n to a prediction of clean speech or spectral features. The inverse neural network mapping $f^{-1}$ can be viewed as a conditional filter, one that filters from pure noise to clean speech, conditioned on the noisy speech n: $f^{-1}(x|n) \to \tilde{c}$ where $\tilde{c}$ is an estimate of the clean data that generated n. In fact, rather surprisingly, $f^{-1}$ when properly trained in this way, very effectively transforms real, noisy speech/noisy spectral samples to enhanced denoised ones. The neural network serves quite well as a speech enhancement system. It can be used as a front-end for an ASR system (and can provide significant benefits when used that way.)

In an embodiment, the training is enhanced by simultaneously maximizing objective functions derived from $f^{-1}$. $f^{-1}$ is effectively a filter that filters from noise to speech, given noisy conditioning information n. Therefore, given a random sample x drawn from uniform random white noise, such an embodiment can also add terms to the optimization criterion based on denoised speech $\tilde{c}=f^{-1}(x|n)$. Further, an embodiment can simultaneously minimize the error on an ASR system decoding the audio $f^{-1}(x|n)$, relative to the true transcript of c, the original sample of clean speech. This results in a component of the loss effectively weighting the errors in a way that reflects human perception, enhancing the perceived quality of the system. Another embodiment can minimize the spectral distance between $\tilde{c}$, and the original clean sample c that was used to generate n. In practice, an end-to-end ASR system may be used to create a differentiable loss term for the aforementioned error of the ASR system decoding the audio $\bar{c}$. Further, distance in spectral-feature space may be used to create a differentiable loss term for the aforementioned spectral distance. As such, in an embodiment, both of these loss terms may be combined with the ordinary normalizing-flow loss term using appropriate weightings to train the neural network.

Minimizing errors in the neural network according to decoding error of an ASR system and minimizing errors in the neural network according to spectral distance as described herein are non-obvious enhancements to neural network training for speech enhancement that significantly improve the value of the results generated by the neural network. Unlike the original WaveGlow method, embodiments incorporate a loss terms using $f^{-1}(x|n)$ in the training. Incorporating this loss term in the training allows such an embodiment to account for human perceptual factors and to optimize the quality from the point of view of comprehensibility.

Figure 3:
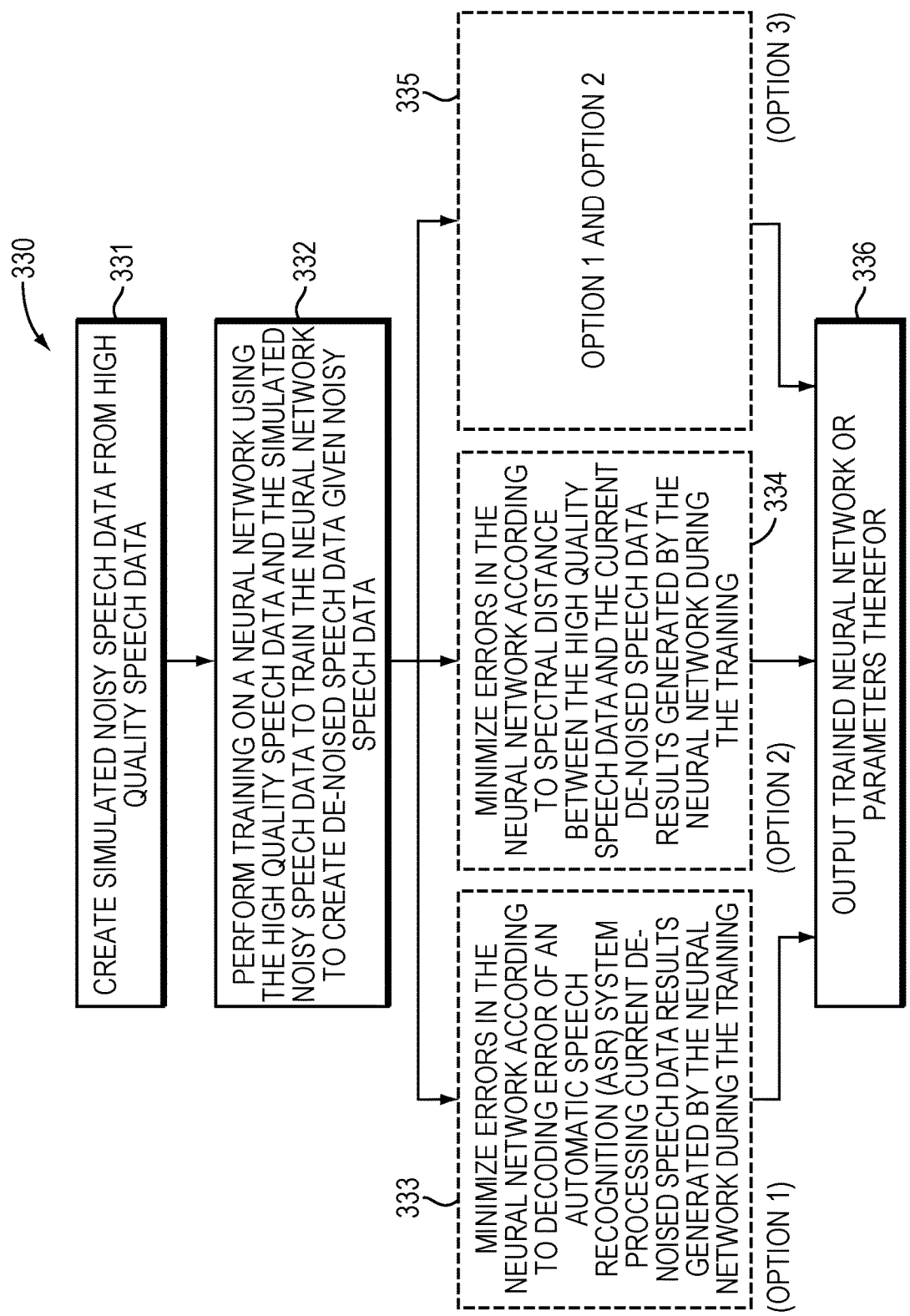
FIG. 3 is a flowchart of a method for training a neural network for de-noising audio enhancement according to at least one example embodiment.

FIG. 3 is a flow diagram of a method 330 for training a neural network for de-noising audio enhancement according to an embodiment. The method 330 is computer implemented and may be performed via any combination of hardware and software as is known in the art. For example, the method 100 may be implemented via one or more processors with associated memory storing computer code instructions that cause the processor to implement the method 330. Further, it is noted that the method 330 may train any neural network known in the art.

The method 330 begins by creating simulated noisy speech data from high quality speech data 331. To continue, the method 330 performs training 332 on a neural network using the high quality speech data and the simulated noisy speech data (created at 331) to train the neural network to create de-noised speech data given noisy speech data. Performing the training 332 includes minimizing errors in the neural network in accordance with three options: 333 (option 1), 334 (option 2), and 335 (option 1 and option 2). For option 1, 333, the errors in the neural network are minimized according to a decoding error of an ASR system processing current de-noised speech data results that are generated by the neural network during the training. Further detail regarding option 1, 333, is described hereinbelow in relation to FIG. 4. For option 2, 334, the errors in the neural network are minimized according to spectral distance between the high quality speech data (the original speech data from which the noisy speech data was created at 331) and the current de-noised speech data results generated by the neural network during the training. For option 3, 335, the errors in the neural network are minimized according to a weighted sum of the likelihood of the source clean data, the decoding error of the denoised speech and the spectral distance between the denoised speech and the original clean speech. Decoding error may be measured according to any differentiable metric (e.g. CTC loss or Bayes Minimum Risk). Spectral distance may be measured by calculating the distance (e.g. measured in $L^1$ or $L^2$ norm) between the mel-filterbank transform of the clean and denoised speech. In turn, the method 330 outputs 336 a trained neural network or parameters for a trained neural network.

In an embodiment of the method 330, the training 332 is deep normalizing flow training. According to an embodiment, performing the training 332, e.g., deep normalizing flow training, trains the neural network to determine an invertible one-to-one mapping of high quality (clean) speech to noise, where the mapping transforms clean speech to random uncorrelated noise as a function of matched noisy speech.

An embodiment generates the de-noised speech estimates during training by using an inverse of the normalizing flow mapping determined during the training 332. The mapping is a function of noisy speech and the inverse mapping is applied to uncorrelated uniform random white noise samples, resulting in an estimate of denoised speech samples that are matched to the provided noisy speech data. According to an embodiment, the inverse mapping denoises speech. The inverse mapping serves as a filter that filters from noise to speech with the same information content that is in the conditioning information. Assuming a well-trained neural network, the output lies in the space of clean speech provided in training, and it matches the linguistic content in the noisy speech.

Another embodiment of the method 330 further comprises generating the current de-noised speech data results during the training by processing at least a portion of the simulated noisy speech data with the neural network. Such functionality uses the neural network that is still undergoing training to determine the current de-noised speech data results. Such an embodiment may further include: determining the decoding error the ASR system used at 333 to minimize errors in the neural network during the training. In such an embodiment, the decoding error of the ASR system is determined by comparing (1) speech recognition results generated by the ASR system processing the current de-noised speech data results and (2) a transcript of at least a portion of the high quality speech data upon which the at least a portion of the simulated noisy speech data was created. It is noted that embodiment may operate with any ASR systems known in the art, such as differentiable ASR systems.

To illustrate such an embodiment, consider an example where clean speech data C is used to generate noisy speech data N at 331. During training, the generated noisy speech data, N, is processed by the neural network undergoing training and the neural network generates an estimate of de-noised speech data DN. The de-noised speech data DN is then processed by the ASR system and the ASR system determines recognized speech R in the de-noised speech data DN. A transcript T of the clean speech data C is then compared to the recognized speech R and the differences between T and R is the decoding error. In turn, the decoding error can be used in the training of the neural network at 333 in order to train the neural to achieve results so that the decoding error is zero, i.e., T and R are the same. In this way, feedback from results of the ASR system are used to improve the training of the neural network.

During the training 332, errors in the neural network may be minimized according to spectral distance between the high quality speech data (the data used to create the noisy data at 331) and results of the neural network processing the created noisy speech data. To illustrate, consider the example where clean speech data C is used to generate noisy speech data N at 331. At 334, the noisy speech data N (or a portion thereof) is processed by the neural network undergoing training to determine a current estimate of de-noised speech data DN. Because the clean speech data C (or a portion thereof) was used at 331 to generate the noisy speech data N (or a portion thereof), ideally, the de-noised speech data DN and the clean speech data C (or corresponding portions thereof) will match. An embodiment uses differences between the clean speech data C and the de-noised speech data DN, the spectral distance, to minimize errors in the neural network. According to an embodiment, the spectral distance is calculated by using a short-time spectral transform (e.g. mel-filterbank transform or gammatone transform), transforming both the clean speech data and the de-noised speech data, then calculating the distance between the match features using a vector norm.

An embodiment of the method 330 further includes creating the simulated noisy speech data at 331 by adding reverberation to the high quality speech data using convolution. Such an embodiment may add the reverberation at 331 using convolution by accessing a database comprising at least one of: measured impulse responses from a reverberant environment and synthetically generated impulse responses. In an embodiment, sounds from a database of environmental noises and music may also be added to the data. Another embodiment collects data from an environment in which the ASR system is to be deployed and creates the simulated noisy speech data at 331 in accordance with the data collected from the environment. For example, if the intended application of the device is within an automotive vehicle, recordings of noise within operating vehicles might be artificially added to simulate the environment. Such an embodiment outputs 336 a neural network or parameters for a neural network that is tailored for the environment in which it will employed in conjunction with the ASR system.

According to an embodiment, training the neural network at 332 includes performing a deep normalizing flow training that includes performing the training by training the neural network to learn a maximum-likely encryption of the high quality speech data given the simulated noisy speech data. Further, according to an embodiment, minimizing the errors at 333, 334, and 335 in the neural network includes adjusting one or more weights of the neural network. Another embodiment of the method 330 includes collecting the high quality speech data in a low noise environment. In such an embodiment, the high quality speech data may be collected via any means known in the art.

Yet another embodiment of the method 330 further comprises, processing noisy speech data using the trained neural network or parameters therefor outputted at 336 to determine enhanced speech data. Such an embodiment may employ the neural network or parameters as a front-end to an ASR system. In an embodiment, the output at 336 is used in a speech enhancement system. According to an embodiment, where the training is deep normalizing flow training, given noisy speech and an independent, uniform sample of noise data of equivalent duration, the inverse of the deep normalizing flow mapping estimated by the network as a function of the noisy speech is used to map the noise data to an estimate of enhanced speech.

Figure 4:
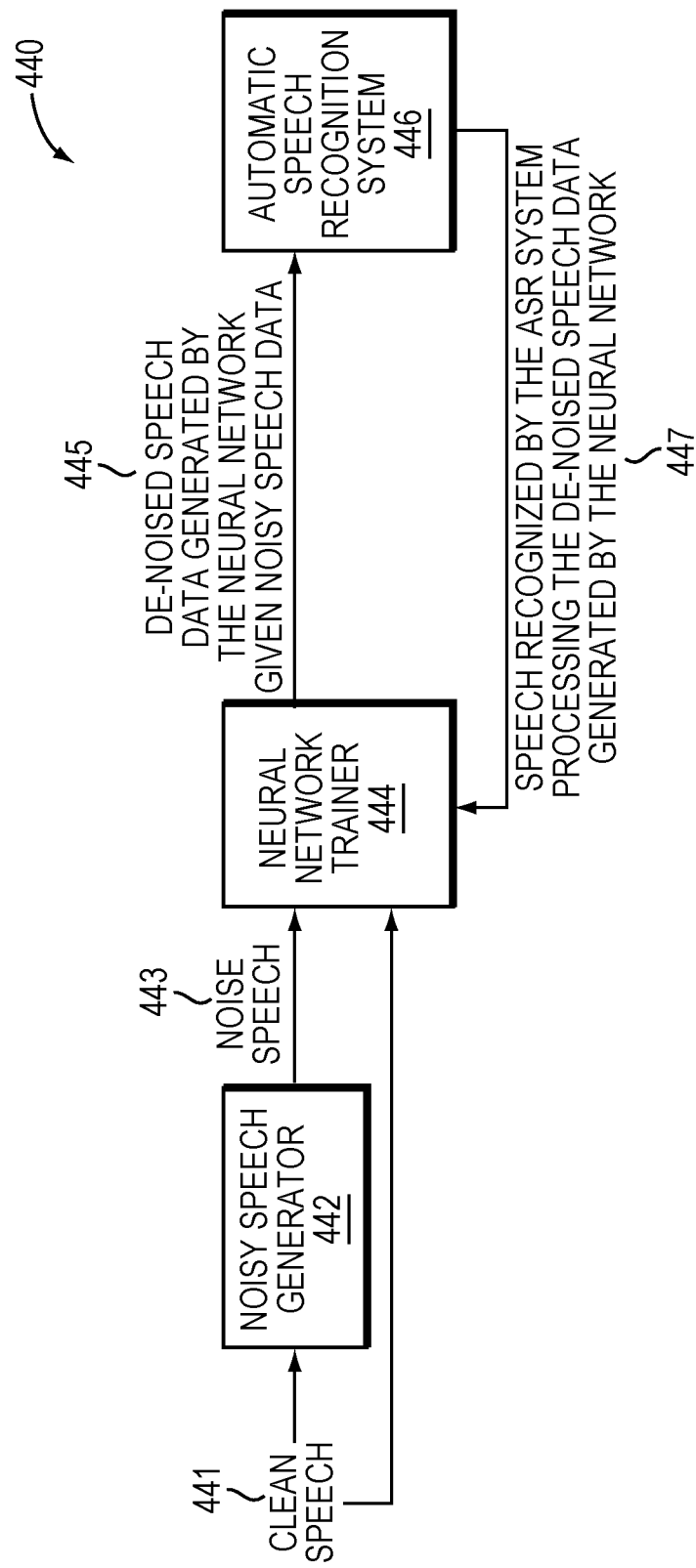
FIG. 4 is a simplified diagram of a system for training a neural network according to an embodiment.

FIG. 4 is a simplified diagram of a system 440 for training a neural network according to an embodiment. The system 440 illustrates an embodiment where a decoding error of the ASR system 446 is used by the neural network trainer 444 to train the neural network. As such, the system 440 illustrates an example of the training option 1 implemented at 333 of the method 330 described hereinabove in relation to FIG. 3.

The system 440 obtains the clean speech 441 and provides the clean speech 441 to the noisy speech generator 442 and to the neural network trainer 444. The noisy speech generator 442 processes the clean speech 441 to create the noisy speech 443. In turn, the noisy speech 443 and clean speech 441 are used by the neural network trainer 444 to train a neural network as described herein. During training, the neural network trainer processes noisy speech 443 (or a portion thereof) to generate the de-noised speech data 445. The de-noised speech data 445 is provided to the ASR system 446 to determine the speech 447 in the de-noised speech data 445. The results of the ASR system 447 are provided to the neural network trainer 444 to use in training.

To illustrate the system 440, consider an example where the noisy speech 443 is used to create the de-noised speech 445 during the training. In this example, the de-noised speech 445 is provided to the ASR system 446 to generate the speech recognition results 447. Because the noisy speech 443 is generated by the noise generator 442 using the clean speech 441, in an ideal implementation, the de-noised speech 445 would be the clean speech 441. As such, in an ideal system where the neural network is used in conjunction with an ASR system, the results of the ASR system 447, will be the same as the clean speech 441 or a transcript of the clean speech 441. Thus, in the system 440, the results 447 of the ASR system 446 are provided to the neural network trainer 444 so that the neural network trainer can determine the difference between the results of the ASR system 447 and the results 445 of the neural network (which ideally will be the clean speech 441). In this way, the trainer 444 can drive the training to generate a neural network where there is no decoding error from the ASR system. In other words, the neural network training is driven so that the results of the ASR system are identical to the clean speech used in training the neural network itself. Further, in an embodiment, the noisy speech generator 442 may generate noisy data that is in accordance with the noise that will be encountered in an operating environment of the ASR system and, thus, the neural network is tailored to operate in accordance with the ASR system.

Figure 5:
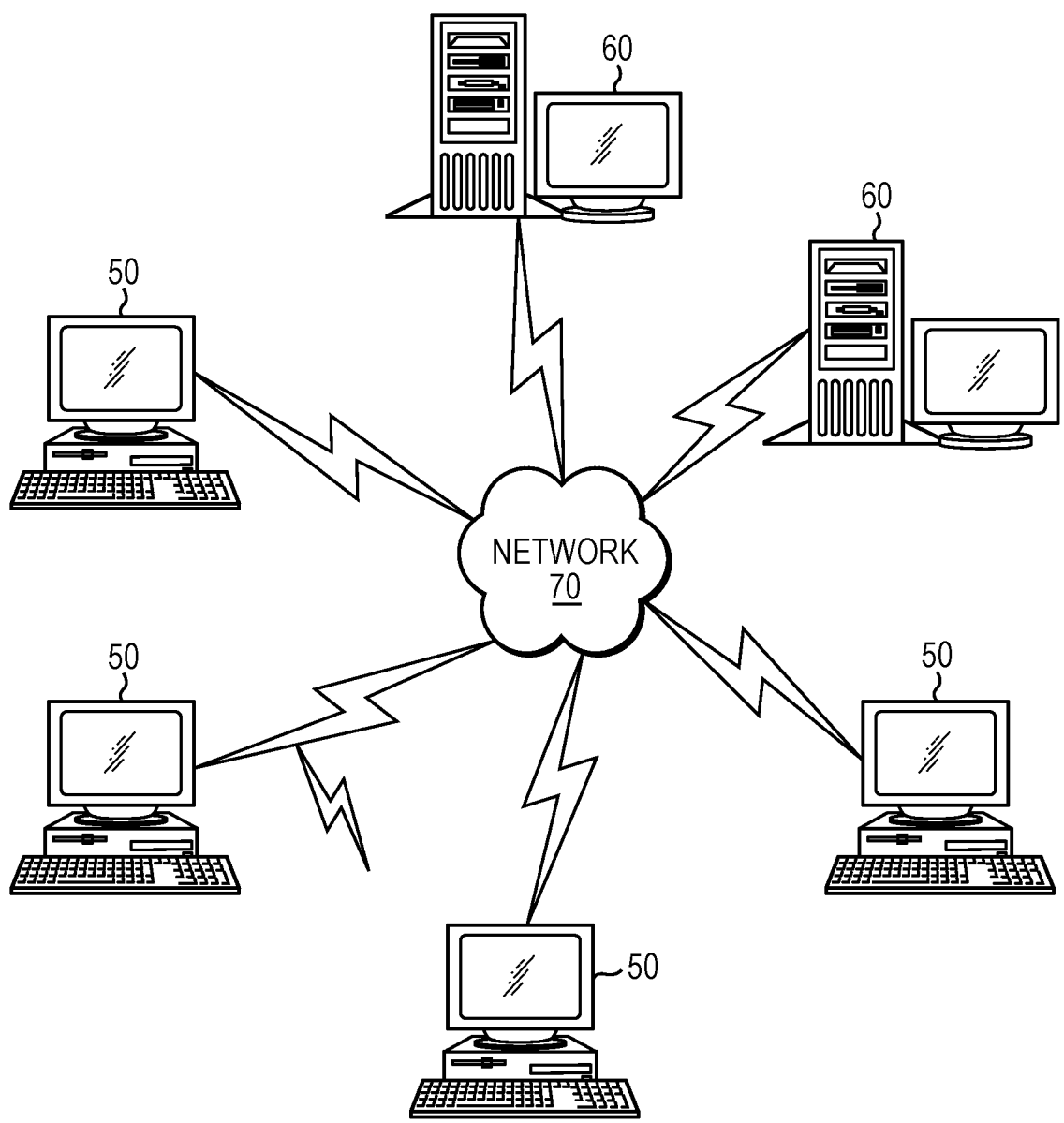
FIG. 5 depicts a computer network or similar digital processing environment in which embodiments of the present invention may be implemented.

FIG. 5 illustrates a computer network or similar digital processing environment in which embodiments of the present disclosure may be implemented. Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 6:
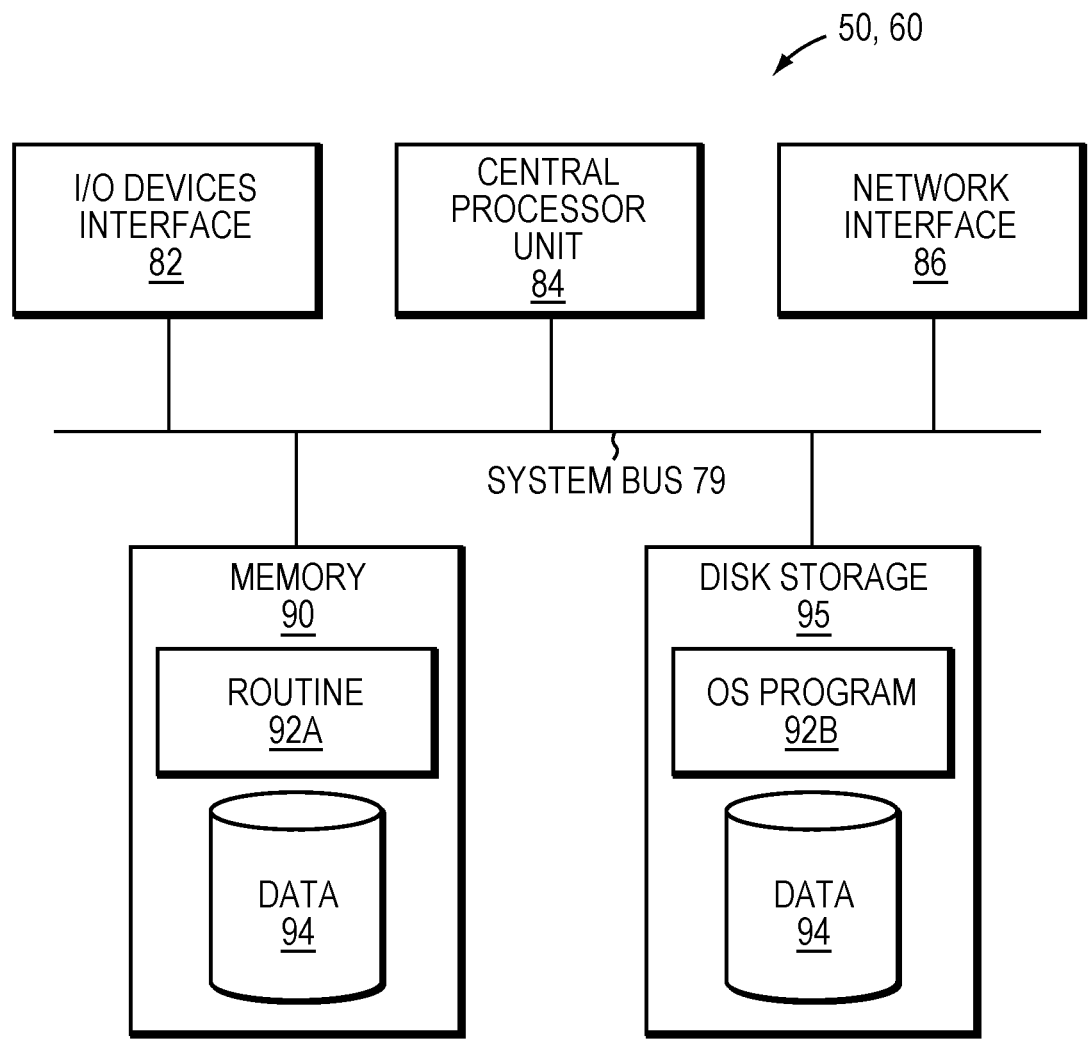
FIG. 6 is a diagram of an example internal structure of a computer in the environment of FIG. 5.

FIG. 6 is a diagram of an example internal structure of a computer (e.g., client processor/device 50 or server computers 60) in the computer system of FIG. 5. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92A and data 94 used to implement an embodiment of the present disclosure. Disk storage 95 provides non-volatile storage for computer software instructions 92B and data 94 used to implement an embodiment of the present disclosure. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for the embodiments. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present invention routines/program 92.

While example embodiments have been particularly shown and described, it will be understood by those skilled in the art that various changes in form and details may be made therein without departing from the scope of the embodiments encompassed by the appended claims.

What is claimed is:

1. A method of training a neural network for de-noising audio enhancement, the method comprising:
    creating simulated noisy speech data from high quality speech data; and
    performing training on a neural network using the high quality speech data and the simulated noisy speech data to train the neural network to create de-noised speech data given noisy speech data, wherein performing the training includes minimizing errors in the neural network based on a weighted sum of:
        a first differentiable loss term based on a decoding error of an Automatic Speech Recognition (ASR) system processing current de-noised speech data results that are generated by the neural network during the training; and
        a second differential loss term based on spectral distance between the high quality speech data and the current de-noised speech data results that are generated by the neural network during the training.

2. The method of claim 1 further comprising:
    generating the current de-noised speech data results during the training by processing at least a portion of the simulated noisy speech data with the neural network.

3. The method of claim 2 further comprising:
    determining the decoding error during the training by comparing (1) speech recognition results generated by the ASR system processing the current de-noised speech data results and (2) a transcript of at least a portion of the high quality speech data upon which the at least a portion of the simulated noisy speech data was created.

4. The method of claim 1 further comprising:
    collecting the high quality speech data in a low noise environment.

5. The method of claim 1 further comprising: creating the simulated noisy speech data by adding reverberation to the high quality speech data using convolution.

6. The method of claim 5 further comprising:
    adding the reverberation using convolution by accessing a database comprising at least one of: measured impulse responses from a reverberant environment and synthetically generated impulse responses.

7. The method of claim 1 further comprising:
    collecting data from an environment in which the ASR system is to be deployed; and
    creating the simulated noisy speech data in accordance with the data collected from the environment.

8. The method of claim 1 further comprising:
    performing the training by training the neural network to learn a maximum-likely encryption of the high quality speech data given the simulated noisy speech data.

9. The method of claim 1 wherein minimizing the errors in the neural network includes: adjusting one or more weights of the neural network.

10. The method of claim 1 further comprising: after the training, processing noisy speech data using the trained neural network to determine enhanced speech data.

11. The method of claim 1 wherein the training is deep normalizing flow training.

12. A computer system for training a neural network for de-noising audio enhancement, the computer system comprising:
    a processor; and a memory with computer code instructions stored thereon, the processor and the memory, with the computer code instructions being configured to cause the system to:
create simulated noisy speech data from high quality speech data; and
perform training on a neural network using the high quality speech data and the simulated noisy speech data to train the neural network to create de-noised speech data given noisy speech data, wherein performing the training includes minimizing errors in the neural network based on a weighted sum of:
a first differential loss term based on a decoding error of an Automatic Speech Recognition (ASR) system processing current de-noised speech data results that are generated by the neural network during the training; and
a second differential loss term based on spectral distance between the high quality speech data and the current de-noised speech data results that are generated by the neural network during the training.

13. The system of claim 12 wherein the processor and the memory, with the computer code instructions, are further configured to cause the system to:
generate the current de-noised speech data results during the training by processing at least a portion of the simulated noisy speech data with the neural network.

14. The system of claim 13 wherein the processor and the memory, with the computer code instructions, are further configured to cause the system to:
determine the decoding error during the training by comparing (1) speech recognition results generated by the ASR system processing the current de-noised speech data results and (2) a transcript of at least a portion of the high quality speech data upon which the at least a portion of the simulated noisy speech data was created.

15. The system of claim 12 wherein the processor and the memory, with the computer code instructions, are further configured to cause the system to:
collect the high quality speech data in a low noise environment.

16. The system of claim 12 wherein the processor and the memory, with the computer code instructions, are further configured to cause the system to:
create the simulated noisy speech data by adding reverberation to the high quality speech data using convolution.

17. The system of claim 16 wherein, in adding the reverberation using convolution, the processor and the memory, with the computer code instructions, are further configured to cause the system to:
access a database comprising at least one of: measured impulse responses from a reverberant environment and synthetically generated impulse responses.

18. The system of claim 12 wherein the processor and the memory, with the computer code instructions, are further configured to cause the system to:
collect data from an environment in which the ASR system is to be deployed; and
create the simulated noisy speech data in accordance with the data collected from the environment.

19. The system of claim 12 wherein the processor and the memory, with the computer code instructions, are further configured to cause the system to:
perform the training by training the neural network to learn a maximum-likely encryption of the high quality speech data given the simulated noisy speech data.

20. The system of claim 12 wherein the processor and the memory, with the computer code instructions, are further configured to cause the system to:
after the training, process noisy speech data using the trained neural network to determine enhanced speech data.

21. The system of claim 12 wherein, in performing the training on a neural network, the processor and the memory, with the computer code instructions, are further configured to cause the system to:
perform deep normalizing flow training.

22. A non-transitory computer program product for training a neural network for de-noising audio enhancement, the computer program product comprising:
one or more computer-readable storage devices and program instructions stored on at least one of the one or more storage devices, the program instructions, when loaded and executed by a processor, cause an apparatus associated with the processor to:
create simulated noisy speech data from high quality speech data; and
perform training on a neural network using the high quality speech data and the simulated noisy speech data to train the neural network to create de-noised speech data given noisy speech data, wherein performing the training includes minimizing errors in the neural network based on a weighted sum of:
a first differential loss term based on a decoding error of an Automatic Speech Recognition (ASR) system processing current de-noised speech data results that are generated by the neural network during the training; and
a second differential loss term based on spectral distance between the high quality speech data and the current de-noised speech data results that are generated by the neural network during the training.

* * * * *